(12) United States Patent
Lyon et al.

(10) Patent No.: US 10,536,786 B1
(45) Date of Patent: Jan. 14, 2020

(54) AUGMENTED ENVIRONMENTAL AWARENESS SYSTEM

(71) Applicant: Google LLC, Mountain View, CA (US)

(72) Inventors: Richard F. Lyon, Los Altos, CA (US); Malcolm Graham Slaney, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/020,721

(22) Filed: Jun. 27, 2018

(51) Int. Cl.
*H04R 25/00* (2006.01)
*G10L 15/18* (2013.01)

(52) U.S. Cl.
CPC .......... *H04R 25/43* (2013.01); *G10L 15/1807* (2013.01); *H04R 25/505* (2013.01); *H04R 25/507* (2013.01); *H04R 25/552* (2013.01); *H04R 25/35* (2013.01); *H04R 25/353* (2013.01); *H04R 25/356* (2013.01); *H04R 2225/39* (2013.01); *H04R 2225/41* (2013.01)

(58) Field of Classification Search
CPC .... H04R 25/35; H04R 25/353; H04R 25/356; H04R 25/43; H04R 25/50; H04R 25/505; H04R 25/507; H04R 2225/39; H04R 2225/41; G10L 15/1807
USPC .................................. 381/313, 316; 700/94
See application file for complete search history.

(56) References Cited

U.S. PATENT DOCUMENTS

| | | | |
|---|---|---|---|
| 7,903,825 | B1 | 3/2011 | Melanson |
| 2013/0158691 | A1* | 6/2013 | Aldaz .................. H04R 1/1091 700/94 |
| 2014/0198934 | A1* | 7/2014 | Recker ................. H04R 25/407 381/313 |
| 2014/0270200 | A1 | 9/2014 | Usher et al. |
| 2015/0230033 | A1* | 8/2015 | Sprague ............... H04R 25/407 381/313 |
| 2017/0188168 | A1 | 6/2017 | Lyren et al. |
| 2017/0230788 | A1* | 8/2017 | Simonides ............. H04W 4/02 |
| 2017/0345429 | A1 | 11/2017 | Hardee et al. |
| 2018/0088900 | A1* | 3/2018 | Glaser .................... H04R 3/005 |
| 2018/0247646 | A1* | 8/2018 | Meacham ............. G10L 15/063 |

OTHER PUBLICATIONS

'ccrma.stanford.edu' [online] "Correlogram Introduction," Available on or before Sep. 12, 2015 via the Wayback Internet Archive, [retrieved on Apr. 9, 2018] Retrieved from Internet: URL<https://ccrma.stanford.edu/~malcolm/correlograms/index.html> 3 pages.

(Continued)

*Primary Examiner* — Jesse A Elbin
(74) *Attorney, Agent, or Firm* — Fish & Richardson P.C.

(57) ABSTRACT

Methods, systems, and apparatus, including computer programs encoded on a computer storage medium, for an augmented environmental awareness system to present new and important sounds to a user in an enhanced auditory experience. In one aspect, a method includes detecting a new sound that was not present in a current auditory environment before the detection, adjusting electrical input signals that are determined to be characteristic of the new sound to generated adjusted electrical signals, generating electrical output signals from the adjusted electrical signals and from the electrical input signals that are not determined to be characteristic of the new sounds, and providing the electrical output signals to audio output transducers.

20 Claims, 5 Drawing Sheets

(56) References Cited

OTHER PUBLICATIONS

'gizmodo.com' [online] "Sony's New Buds Have Holes in Them for Your Own Good," Sam Rutherford, Feb. 26, 2018, [retrieved on Mar. 7, 2018] Retrieved from Internet: URL<https://gizmodo.com/sonys-new-buds-have-holes-in-them-for-your-own-good-1823319123> 4 pages.

'https://cocoha.org' [online] "COCOHA," Available on or Before Oct. 18, 2016, [retrieved on Mar. 7, 2018] Retrieved from Internet: URL<https://cocoha.org/> 2 pages.

'news.stanford.edu' [online] "'Necklace' designed to aid those with profound hearing loss," Dawn Levy, Jun. 6, 2001 [retrieved on Mar. 7, 2018] Retrieved from Internet: URL<https://news.standford.edu/news/2001/june6/widrow-66.html> 3 pages.

'thewisecutter.com' [online] "The Best Personal Sound Amplification Product," Jan. 8, 2018, [retrieved on Mar. 7, 2018] Retrieved from Internet: URL<https://thewirecutter.com/reviews/best-personal-sound-amplification-product/> 26 pages.

'www.bose.com' [online] "Bose Hearphones," available on or before Aug. 29, 2017, [retrieved on Mar. 7, 2018] Retrieved from Internet: URLhttps://www.bose.com/en_us/products/headphones/conversation_enhancing_headphones/hearphones.html> 15 pages.

Alnahwi et al. "Comparison between Frequency transposition and frequency compression hearing aids," Egypt Journal of Otolaryngol, vol. 31(1), 2015, [retrieved on Mar. 7, 2018] Retrieved from Internet: URL<http://www.ejo.eg.net/printarticle.asp?issn=1012-5574;year=2015;volume=31;issue=1;spage=10;epage=18;aulast=alnahwi> 8 pages.

Broderick et al. "Electrophysiological correlates of semantic dissimilarity reflect the comprehension of natural, narrative speech," preprint posed online Sep. 24, 2017, at Internet: URL<https://www.biorxiv.org/content/early/2017/09/24/193201> 18 pages.

Brown et al. "A Structural Model for Binaural Sound Synthesis," IEEE Transaction on Speech and Audio Processing, vol. 6, No. 5, Sep. 1998, 13 pages.

Ephraim et al. "Speech Enhancement Using a Minimum Mean-Square Error Log-Spectral Amplitude Estimator," IEEE Transactions on Acoustics, Speech, and Signal Processing, vol. ASSP-33, No. 2, Apr. 1985, 3 pages.

Hershey et al. "CNN Architecture fro Large-Scale Audio Classification," arXiv 1609.09430v2, Jan. 10, 2017, 5 pages.

Kaya et al. "Modelling auditory attention," Phil. Trnas. R. Soc. B 372, Accepted Sep. 19, 2016, 11 pages.

Mesgarani et al. "Discrimination of Speech From Nonspeech Based on Multiscale Spectro-Temporal Modulation," IEE Transactions on Audio Speech and Language Processing, vol. 14, No. 3, May 2006, 11 pages.

O'Sullivan et al. "Attentional Selection in a Cocktail Party Environment Can Be Decoded from Single-Trial EEG," Cerebral Cortex, Jul. 2015, 10 pages.

O'Sullivan et al. "Neural decoding of attentional selection in multi-speaker environments without access to clear sources," Journal of Neural Eng. vol. 14 (056001), Aug. 2017, 15 pages.

Slaney et al. "Baby Ears: A Recognition System for Affective Vocalization," Reprint. Proceedings of the 1998 International Conference on Acoustics, Speech and Signal Processing, May 1998, 4 pages.

PCT International Search Report and Written Opinion in International Application No. PCT/US2019/038099, dated Sep. 9, 2019, 15 pages.

* cited by examiner

400

Adjust the electrical input signals that are determined to be characteristic of the new sound to cause a frequency shift in the new sound when the adjusted electrical input signals are used to cause the audio output transducers to generate audio output.
402

Generate the adjusted electrical input signals that are determined to be characteristic of the new sound
404

Adjust an amplitude of the electrical input signals that are determined to be characteristic of the new sound.
412

Generate the adjusted electrical input signals that are determined to be characteristic of the new sound
414

FIG. 4B

AUGMENTED ENVIRONMENTAL AWARENESS SYSTEM

BACKGROUND

Many kinds of hearing assistant devices modify the auditory environment to provide an enhanced auditory experience. Examples of such devices include conventional hearing aids, personal sound amplification devices, and augmented reality systems. Some of these devices can determine what a user is interested in hearing (e.g., using eye gaze) and provide an enhancement in the auditory environment.

People, however, have limited ability to comprehend more than one auditory source at a time. Moreover, such abilities tend to degrade with age, especially when age-related hearing loss takes effect.

SUMMARY

This specification describes technologies relating to an augmented environmental awareness system to present new sounds to a user in an enhanced auditory experience.

In general, one innovative aspect of the subject matter described in this specification can be embodied in methods that include the actions of a system including audio output transducers that transduce electrical output signals into acoustic sounds and a signal processing device that receives as input electrical input signals, and in data communication with the audio output transducers to provide the electrical output signals to the audio output transducers, and where the signal processing device is arranged to execute instructions that cause the signal processing device to perform operations including detecting, based on the electrical input signals and data describing a current auditory environment, a new sound that was not present in the current auditory environment before the detection, adjusting electrical input signals that are determined to be characteristic of the new sound to generate adjusted electrical signals, generating electrical output signals from the adjusted electrical signals that are determined to be characteristic of the new sound and from electrical input signals that are not determined to be characteristic of the new sound, and providing to the audio output transducers the electrical output signals.

These and other embodiments can each optionally include one or more of the following features. In some implementations, the data describing the current auditory environment includes data generated from electrical input signals received prior to the received electrical input signals from which the new sound was detected.

In some implementations, the system further includes multiple audio input transducers that transduce acoustic sounds into electrical input signals, where the signal processing device is in data communication with the audio input transducers and detecting the new sound that was not present in the current auditory environment before the detection based on the electrical input signals and data describing the current auditory environment includes detecting the new sound from the electrical input signals provided from the audio input transducers.

In some implementations, generating the adjusted electrical signals that are determined to be characteristic of the new sound includes storing the electrical input signals that are determined to be characteristic of the new sound for a duration of a current sound of interest.

In some implementations, generating the electrical output signals from the adjusted electrical signals and electrical input signals that are not determined to be characteristic of the new sound includes generating the electrical output signal from the electrical input signals that are not determined to be characteristic of the new sound and the stored electrical input signals are determined to be characteristic of the new sound.

In some implementations, generating the adjusted electrical signals that are determined to be characteristic of the new sound includes monitoring the electrical input signals to detect an absence of a current sound of interest, where storing the electrical input signals that are determined to be characteristic of the new sound occurs during the monitoring. Monitoring the electrical input signals to detect the absence of a current sound of interest can include detecting a prosodic signal that is indicative of an end of the current sound of interest.

In some implementations, generating the electrical output signals from the adjusted electrical signals and electrical input signals that are not determined to be characteristic of the new sound includes inserting the stored electrical input signals that are determined to be characteristic of the new sound in the generated electrical output signals at a time that the current sound of interest is absent.

In some implementation the new sound is a sound generated by speech (e.g., a person speaking, or computer audio file of a person speaking).

In some implementations, generating the adjusted electrical input signals that are determined to be characteristic of the new sound to cause a frequency shift in the new sound when the adjusted electrical signals are used to cause the audio output transducers to generate audio output.

In some implementations, detecting a new sound that was not present in the current auditory environment before the detection based on the electrical input signals and data describing the current auditory environment includes determining a directional component indicative of a source of the new sound. Generating the electrical output signals from the adjusted electrical signals and the electrical input signals that are not determined to be characteristic of the new sound can include generating the electrical outputs signals so that the electrical output signals cause the audio output transducers to generate the new sound as originating form a position that is defined by the directional component.

In some implementations, adjusting the electrical input signals that are determined to be characteristic of the new sound to generate adjusted electrical signals includes adjusting an amplitude of the electrical input signals that are determined to be characteristic of the new sound.

Other embodiments of this aspect include corresponding methods, apparatus, and computer programs.

Particular embodiments of the subject matter described in this specification can be implemented so as to realize one or more of the following advantages. In a conversational situation, where a hearing device is focused on one particular source, the augmented environmental awareness system can make a user aware of new sounds through enhancing the audibility of sources of the sounds. New sounds can be adjusted to fit into the auditory environment such that the new sound is presented to the user at a time and place where it is easily separable from the foreground sound, and in a way that allows the user's auditory system to easily separate the foreground from the background.

Real-time and personalized auditory environments can be provided to a user, where the system can detect and recognize new sounds of interest to the user and only highlight the new sounds of interest in an auditory environment for the user. By only highlighting the new sounds that are sounds of interest to the user, the system can provide an auditory environment to the user with reduced background noise and fewer distracting sounds. Moreover, the system can account for a current sound of interest in the user's auditory environment and determine an importance or interest level for a new sound detected in the user's auditory environment relative to the current sound of interest and adjust the presentation of the new sound accordingly. For example, a virtual reality experience can be enhanced by staging sounds in real-time, such that a user's focus is drawn to new important sounds in a virtual environment of the virtual reality experience, and/or are alerted to new important sounds in the auditory environment outside the virtual reality experience.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4A is flow diagram of another example process for generating the electrical output signals.

FIG. 4B is a flow diagram of another example process for generating the electrical output signals.

Like reference numbers and designations in the various drawings indicate like elements.

DETAILED DESCRIPTION

Overview

The technology in this patent application is intended to help users be aware of new auditory objects in their environment. The technology enhances the audibility of new sources when users are in a focused auditory situation. There are two main features implemented by this technology: detection and presentation. Detection relates to identifying new sounds in a current auditory environment, and presentation relates to adjusting the presentation of the new sound so that the user is more likely to notice the new sound.

More particularly, the technology in this patent application is related to detecting a new sound in a user's auditory environment, adjusting the new sound relative to the auditory environment, and presenting the adjusted new sound and auditory environment to the user. The user's auditory environment can include sounds that are naturally generated and sounds that are machine generated. In some implementations, a user's auditory environment is presented to the user through a filtering process, for example, where the sounds are processed using beam forming (e.g., to concentrate the user's attention towards one particular source of sound), background noise attenuation (e.g., to reduce unwanted noise), or level adjustment of natural sounds vs. machine-generated sounds.

The adjustment of the new sound in order to highlight the new sound in the user's auditory environment may be by imposing a time-delay in the presentation of the new sound (e.g., during a pause in the auditory environment), by frequency transposition of the new sound (e.g., to distinguish the new sound in frequency relative to the auditory environment), by adjusting the amplitude of the new sound (e.g., increasing the relative volume of the new sound to draw attention to it), or by a combination thereof. The system can determine a type of adjustment of the new sound based in part on a type of sound that is being adjusted. For example, new sound types of speech and non-speech may be adjusted differently from each other to better highlight the new sound when it is presented to the user in the user's auditory environment. The type of adjustment of the new sound can be based in part on a determined importance of the new sound (e.g., based on a classification of the sound), such that the presentation of the adjusted new sound is more or less intrusive to the user's auditory environment. The type of adjustment of the new sound can be based in part on user preference, such that a user may select a type of adjustment to sounds of a particular type (e.g., a class of sounds) when the new sound is presented to the user in the user's auditory environment.

These features and additional features are described in more detail below.

Example Operating Environment

Figure 1:
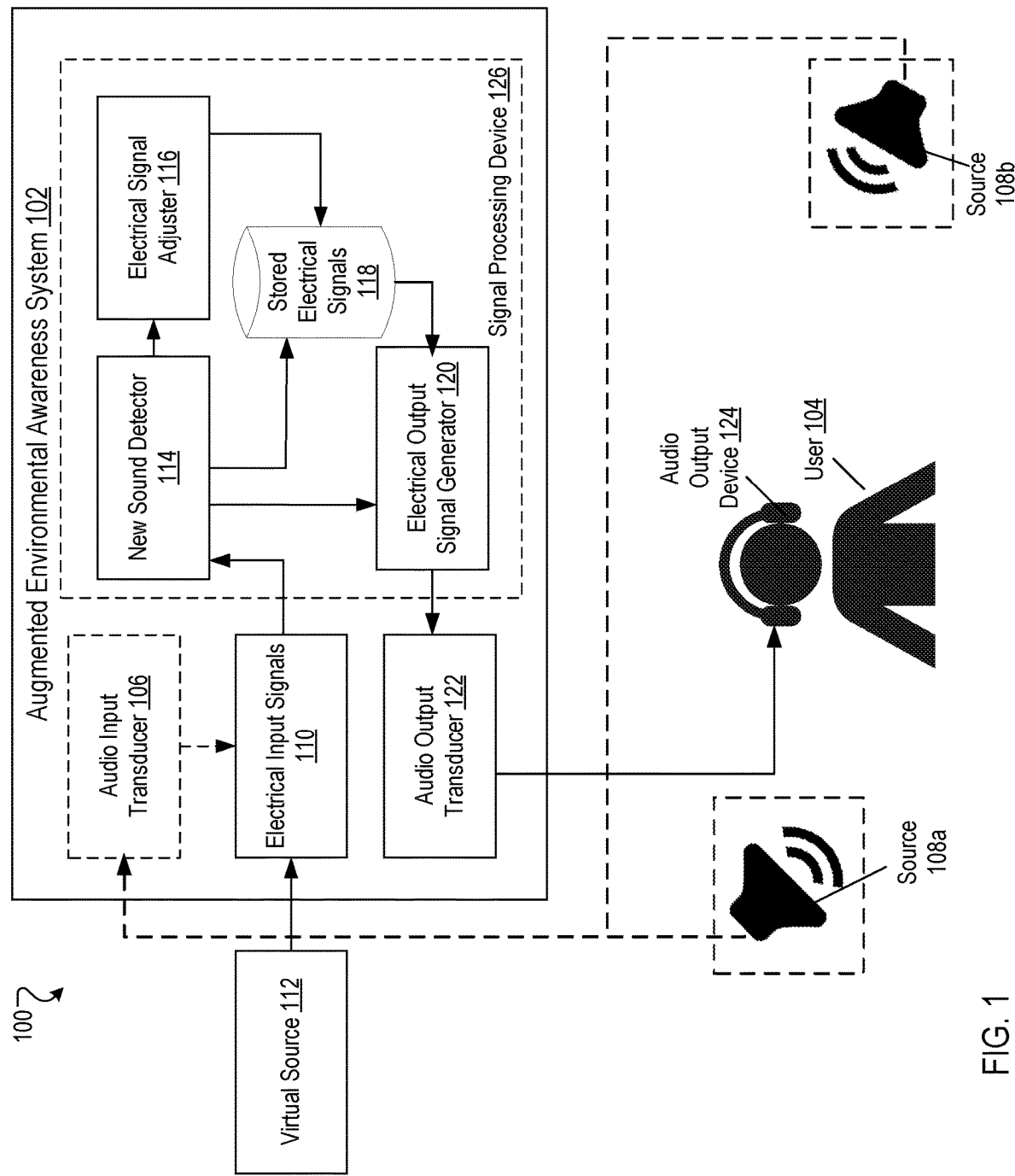
FIG. 1 is a block diagram of an example operating environment for the augmented environmental awareness system.

FIG. 1 is a block diagram of an example environment 100 in which an augmented environmental awareness system 102 provides an enhanced auditory experience to a user 104. An auditory environment for the user 104 includes all sounds that are presented to the user 104 (e.g., all sounds in the user's audible range). The auditory environment can include sounds from a real environment (e.g., audio signals in the area surrounding the user), or sounds from a virtual environment (e.g., synthesized audio signals), or a combination thereof.

In some implementations, the auditory environment may include frequencies outside the nominal audible range of the user 104 (e.g., high pitch sounds or low pitch sounds). The audible range of sounds presented to the user 104 in the auditory environment may depend in part on a sensitivity of the audio input transducers 106 (e.g., the conversion efficiency of an audio input transducer 106 converting acoustic pressure into an electric voltage).

The augmented environmental awareness system 102 optionally includes an audio input transducer 106 which can receive audio input sounds from one or more audio sources 108a, 108b in the user's 104 auditory environment. The audio input transducer 106 can convert audio input signals from the one or more sources 108a, 108b into electrical input signals 110. Audio sources 108a, 108b are human, animal, sound producing devices, or environmental events that produce sound and that is presented to the user 104. Sources 108a, 108b can include a person (e.g., a person speaking), an ambient noise (e.g., weather, traffic), an alarm (e.g., sirens, alerts), an animal (e.g., a dog barking), or the like.

The augmented environmental awareness system 102 can also receive electrical input signals 110 that are characteristic of sound originating from one or more virtual sources 112. Electrical input signals 110 include, for example, stored electrical signals (e.g., data that are stored as part of a sound file and that are processed electronically), and electrical signals that can be generated (e.g., by a computer) from stored audio files (e.g., mp3 files). Electrical input signals 110 that are characteristic of sound originating from a virtual source 112 can be provided by virtual reality systems, augmented reality systems, computers, media playback devices (e.g., mp3 player, video player), a user's smart phone, or other devices where sound originating from the virtual source 112 is produced by providing the electrical input signals 110 to one or more audio output transducers (e.g., speakers, headphones).

Electrical input signals 110 can be used to describe, e.g., represent, a current auditory environment for the user 104. In some implementations, additional data can also be used to describe a current auditory environment. Examples of such data describing the current auditory environment for the user 104 can include information relating to what is in the user's 104 field of vision (e.g., in a virtual or augmented reality experience), and buffered audio data from a most recent period of time, e.g., the last three seconds, for example. The augmented environmental awareness system 102 can define a background level of a current auditory environment by monitoring a variance in a spectrogram of the current auditory environment. Background estimation and subtraction algorithms can be used to remove background noise from the current auditory environment, for example, to perform speech enhancement. One example process for performing speech enhancement is described in "Speech enhancement using a minimum-mean square error shorttime spectral amplitude estimator", Ephraim, Y., et al., *IEEE Transactions on Acoustics, Speech, and Signal Processing*, vol. 32, no. 6, pp. 1109-1121, December 1984. Other processes can also be used.

The augmented environmental awareness system 102 can monitor sounds in the area surrounding the user 104 to detect new sounds. For example, the augmented environmental awareness system 102 may continually or periodically scan the area surrounding the user (e.g., beam steering in a radius around the user) to check for new sounds, and process the audio input and electrical input signals 110 to detect a new sound in the auditory environment. The electrical input signals 110 provided by the audio input transducer 106, by the virtual source 112, or a combination of the audio input transducer 106 and the virtual source 112 are provided to a new sound detector 114.

In some implementations, the new sound is detected based on the electrical input signals 110 and data describing the current auditory environment from the electrical input signals 110 provided from the audio input transducers 106. For example, the new sound can be a person speaking, a car door closing, or a siren in the area around the user 104.

In some implementations, the new sound is detected based on the electrical input signals 110 and data describing the current auditory environment from the electrical input signals 110 provided from the virtual sources 112. For example, the new sound can be a virtual person speaking in a virtual reality experience in which the user 104 is participating, or, alternatively, a real person speaking in the physical environment in which the user is located.

The new sound detector 114 can detect, based on the electrical input signals 110 and data describing a current auditory environment, a new sound in the auditory environment that was not present before the detection. The new sound can be determined to be originating from a source 108a, 108b and/or from a virtual source 112, depending on the actual origin of the new sound.

More specifically, a new sound is a sound that is determined to not be a part of the auditory environment prior to the detection of the new sound by the new sound detector 114. A new sound can be, for example, a person speaking, a siren, a car door closing, a phone ringing, a dog bark, or another sound that is detected within the auditory environment of the user 104 and that was not present before such detection. In one example, the new sound is a sound generated by speech (e.g., a speaking person). In another example, the new sound is not a speech signal (e.g., a car driving by).

Electrical signals characteristic of the new sound detected by the new sound detector 114 is provided to the electrical signal adjuster 116. The electrical signal adjuster 116 can perform one or more adjustments (e.g., time delay, frequency or pitch shift, amplitude shift, etc.) to the electrical input signals that are determined to be characteristic of the new sound to generate adjusted electrical signals.

Adjustments to the electrical input signals determined to be characteristic of the new sound can depend in part on a classification of the new sound. An adjustment to the electrical input signals determined to be characteristics of the new can cause audio output from an output electrical signal generated by the adjusted electrical signal to be more or less intrusive to the user's auditory environment based in part on the classification of the new sound. An importance of a type sound to the user (e.g., classified as a sound from a siren), a relative location of the source of the new sound (e.g., a source that is in the field of vision of the user versus behind the user), a degree of familiarity of the new sound (e.g., the user's spouse speaking versus a radio commercial), can each affect a type of adjustment made to the electrical input signals determined to be characteristic of the new sound. In one example, a position of a source of the new sound outside of the user's 104 field of vision may result in a first type of adjustment (e.g., a time-delay of the new sound), and a position of the source of the new sound inside of the user's 104 field of vision may result in a second type of adjustment (e.g., a frequency shift of the new sound). Adjusted electrical signals are discussed in more detail with reference to FIGS. 3, 4A, and 4B below.

In some implementations, adjustments to the electrical input signals determined to be characteristic of the new sound can depend in part on user preference. A user 104 can indicate to the augmented environmental awareness system 102 a type of adjustment that the user prefers for a new sound. In one example, the user 104 may designate a type of adjustment (e.g., frequency shift) for new sounds based on a type of sound (e.g., speech-type sounds). In another example, the user 104 may designate a type of adjustment (e.g., amplitude shift) for all new sounds.

In some implementations, adjustments to the electrical input signals determined to be characteristic of the new sound can depend in part on a classification of a current sound of interest in the user's auditory environment. For example, a time-delay adjustment can be applied to the electrical input signals determined to be characteristic of the new sound when a current sound of interest is determined to be a speech-type of sound (e.g., the user 104 is engaged in conversation). In another example, an amplitude shift adjustment can be applied to the electrical input signals determined to be characteristic of the new sound when a current sound of interest is determined to be a non-speech type of sound (e.g., the user 104 is listening to music).

In some implementations, adjustments to the electrical input signals determined to be characteristic of the new sound can depend in part on circumstances (e.g., time and physical space) of the user's auditory environment. A user may find a particular new sound more or less important based on the circumstances of the user when the new sound is detected, and a type of adjustment of the electrical input signals determined to be characteristic of the new sound can be different depending on the importance. For example, a user's auditory environment may be a workplace setting (e.g., the user is at work) and new sound is a phone ringing which may have high importance to the user. The electrical input signals determined to be characteristic of the phone ringing can be adjusted with a shift in amplitude (e.g., make it louder) as result. In another example, a coworker sneezing in the user's workplace setting may have low importance to the user, such that the electrical input signals determined to be characteristic of the sneeze can be time-delayed.

In some implementations, the new sound detector 114 can detect multiple new sounds present in a current auditory environment. The new sound detector 114 may rank the multiple new sounds (e.g., rank in terms of relative importance of the new sounds to the user) to determine a type of adjustment or a degree to which the electrical input signals determined to be characteristic of each new sound should be adjusted. For example, the new sound detector 114 may detect in a current auditory environment of the user 104 two new sounds: a speaking person outside the user's 104 field of vision and the user's mobile phone ringing. The new sound detector can determine that the speaking person ranks higher than the user's mobile phone ringing and adjust the electrical input signals for each sound accordingly. In another example, the new sound detector 114 may detect in a current auditory environment of the user 104 two new sounds: a speaking person inside the user's 104 field of vision and a speaking person outside the user's 104 field of vision. The new sound detector can determine that the speaking person inside the user's field of vision ranks higher than the user outside the user's field of vision (e.g., because it prevents audio/visual from being out of sync).

In some implementations, the electrical input signals determined to not be characteristic of the new sound and the adjusted electrical signals are stored as stored electrical signals 118. How long the electrical signals are stored may depend, for example, on the duration of the new sound. For example, the adjusted electrical signals can be stored in the stored electrical signals 118 until a current sound of interest is determined to be absent (e.g., a current person speaking finishes a statement). Alternatively, only the most recent N seconds of the electrical signals for the new sound may be stored.

An electrical output signal generator 120 can generate electrical output signals from the adjusted electrical signals and the electrical input signals that are not determined to be characteristic of the new sound. In some implementations, the electrical output signal generator 120 receives stored electrical signals 118 including adjusted electrical signals and electrical input signals that are not determined to be characteristic of the new sound.

In some implementations, the new sound detector 114 does not detect a new sound such that no electrical signals are adjusted, and the new sound detector 114 functions as a pass through for received electrical input signals 110 and provides them to the electrical output signal generator 120.

The electrical output signals are provided to one or more audio output transducers 122 that transduce the electrical output signals into acoustic sounds. The acoustic sounds can then be provided to one or more audio output devices 124 to present the acoustic sounds to the user 104. An audio output device 124 can include, for example, headphones, speakers, hearing aids, or the like.

In some implementations, an audio output device 124 can be a component of a virtual reality or augmented reality system. The audio output device 124 can provide audio for a virtual reality or augmented reality system that also includes a visual presentation of the virtual reality or augmented reality experience. In one example, an augmented reality system includes wearable "smart" glasses that include an audio output device 124 (e.g., earbuds, integrated speakers).

The processes performed by the new sound detector 116, the electrical signal adjuster 116, the electrical output signal generator 120 are performed by one or more signal processing devices 126. The signal processing device 126 can be in data communication with the audio output transducers 122, or the audio output transducers and the audio input transducers 106. The signal processing device 126 can receive as input electrical input signals 110 and can provide electrical output signals to the audio output transducers 122.

Example Operation of Augmented Environmental Awareness System

Figure 2:
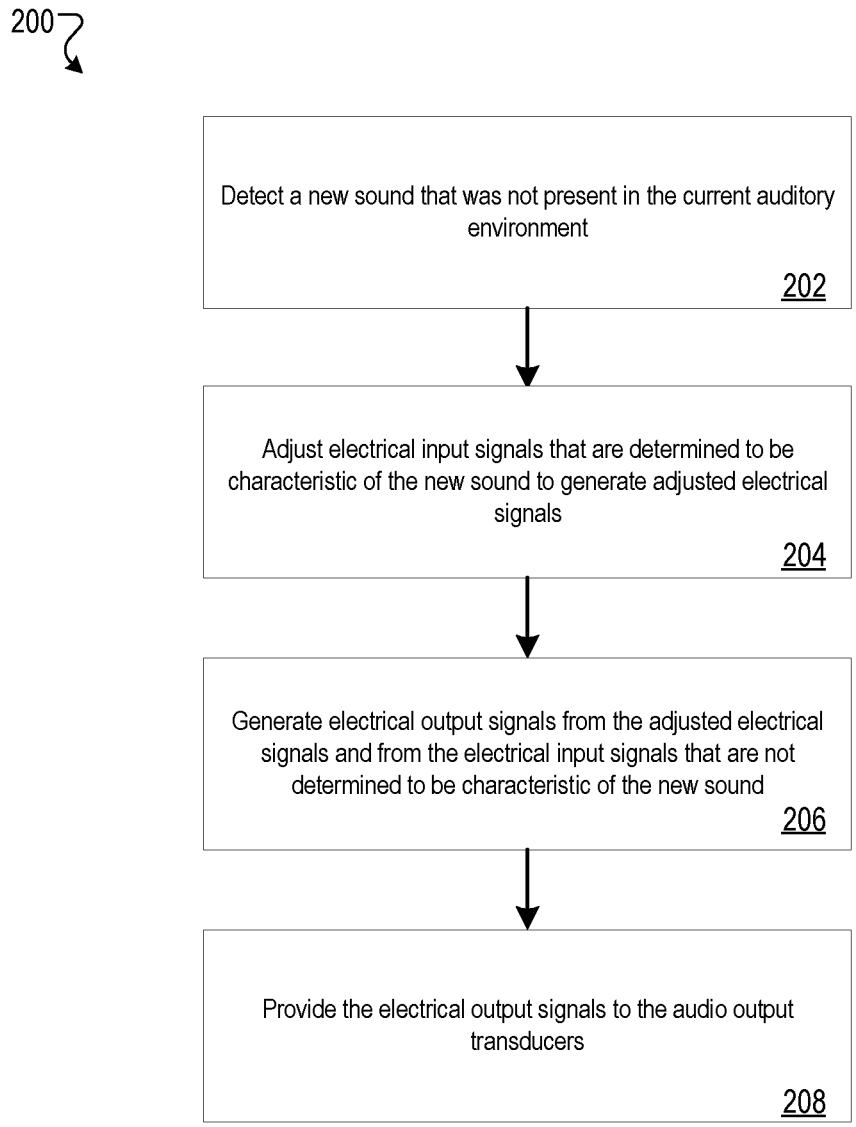
FIG. 2 is a flow diagram of an example operation of the augmented environmental awareness system

FIG. 2 is a flow diagram of an example operation 200 of the augmented environmental awareness system 102. The current auditory environment and the new sound can include sounds from real sources (e.g., sources 108a, 108b), virtual sources (e.g., virtual source 112), or a combination of real sources and virtual sources (e.g., in an augmented reality experience).

A new sound is detected that was not present in the current auditory environment (202). The new sound can be detected by the new sound detector 114 from the electrical input signals 110 received by the new sound detector 114, where the electrical input signals 110 can originate from a virtual source 112, an audio input transducer 106 converting audio signal from one or more sources 108a and 108b, or a combination thereof. In some implementations, a variance of a spectrogram computed of the sounds in a current auditory environment of the user 104 can be used to determine if a new sound is present in the auditory environment. For example, the current auditory environment can be captured by looking at statistics of a spectrogram of the current auditory environment or a modulation spectrogram of the current auditory environment, and deviations from normal can be detected as new sounds The new sound detector 114 can, for example, use machine-learning techniques for recognizing new sounds that are distinct from the current auditory environment. A statistical model may be used to characterize the electrical input signals 110 and determine if electrical input signals 110 are characteristic of a new sound (e.g., are determined to be outside a range of the current auditory environment). The new sound detector 114 can use one or more of an environmental sound background model, auditory saliency model, a binaural localization model, and speech detectors to evaluate electrical input signals 110 to determine if a new sound is present in the current auditory environment. Other processes may be used by the new sound detector to determine is a new sound is present in the current auditory environment.

For example, an environmental sound background model can be used to identify background noises in the electrical input signals such that the new sound detector 114 can better separate a potential new sound from the background noise in the current auditory environment. One example of how the augmented awareness system 102 can use a speech activity detector to distinguish new sounds (e.g., can detect new speech signals) is described in N. Mesgarani, et al., "Discrimination of speech from nonspeech based on multiscale spectro-temporal Modulations," in *IEEE Transactions on Audio, Speech, and Language Processing*, vol. 14, no. 3, pp. 920-930, May 2006. In another example, an audio event classifier can be used to detect when new types of sounds are present, as described in Hershey, Shawn, et al., "CNN Architectures for Large-Scale Audio Classification,"

accepted for publication at ICASSP 2017, last revised 10 Jan. 2017 (arXiv:1609.09430v2). Other processes can also be used. The augmented environmental awareness system 102 can distinguish between foreground sounds (e.g., important sounds that are relevant to the user) and background sounds (e.g., unimportant sounds that are irrelevant to the user).

In another example, an auditory saliency model can be used to determine what stands out perceptually to the user 104 in the auditory environment. User 104 reaction to sounds that are detected by the augmented environmental awareness system 102 in the auditory environment can be monitored (e.g., gaze tracking, Electroencephalography signals) in order to determine what sounds are perceived by the user 104. One method for determining auditory saliency is described in Kaya, E M, et al., "Modeling auditory attention" in *Philosophical transactions of the Royal Society B*, vol 372, issue 1714, publish 19 Feb. 2017. Speech topics that are new can be determined, for example, using a system described in Broderick, Michael P., et al., "Electrophysiological correlates of semantic dissimilarity reflect the comprehension of natural, narrative speech", in *Current Biology*, vol 28, Issue 5, 803-809.e3. Additionally, electroencephalography signals can be used to determine when sounds are interesting (e.g., should be adjusted to draw attention to the sound in the user's auditory environment), as described, for example, in O'Sullivan, J., et al., "Neural decoding of attentional selection in multi-speaker environments without access to separated sources" in *Conf Proc IEEE Eng Med Biol Soc.* 2017 July; 2017:1644-1647. Other processes can also be used.

In another example, a binaural localization model can be used to determine an orientation of a source of a new sound relative to the user 104. For example, new sound detector 114 can use the binaural localization model to determine a relative position of the source of the new sound to the user 104 (e.g., behind the user, in front of the user). The location information extracted using the binaural localization model can be used by the augmented environmental awareness system 102 to determine a type of adjustment that should be made to the new sound. In one example, directional sounds can be synthesized by creating interaural level differences (ILD) and interaural time differences (ITD) using a process described in Brown, C. Phillip, et al., "A Structural Model for Binaural Sound Synthesis,' in *IEEE Transactions on Speech and Audio Processing*, vol. 6, no 5, September 1998. Other processes can also be used.

The new sound detector 114 can determine a class for the new sound. Sounds that are determined to be present in the auditory environment may be classified (e.g., as a siren, person speaking, music, wind) and an importance of each class of sound can be determined.

The new sound detector 114 can, for example, use neural networks/machine learning to classify the new sound including a type of source of the sound (e.g., human, animal, machine), a degree of importance of the new sound (e.g., important or unimportant), a familiarity of the new sound to the user (e.g., speech from a known person vs a car door closing), a position of the source of the sound relative to the user (e.g., a source that is in front of the user or a source that is behind the user). The new sound detector 114 may further classify a type of speech (e.g., a conversational speech, an alert speech) of the new sound for a new sound that is classified as speech based. For example, the new sound detector 114 may distinguish a speech that is an alert type (e.g., "Look out behind you!") and a speech that is a conversational type (e.g., "Nice to meet you"). Emotions and/or changes in emotion can be detected, for example, using a system described in Slaney, M., et al., "Baby Ears: a recognition system for affective vocalizations," *Acoustics, Speech and Signal Processing*, 1998. *Proceedings of the 1998 IEEE International Conference on*, Seattle, Wash., 1998, pp. 985-988 vol. 2. In another example, new sounds can be identified and classified using AudioSet technology described in Hershey, Shawn, et al., "CNN Architectures for Large-Scale Audio Classification," accepted for publication at *ICASSP* 2017, last revised 10 Jan. 2017 (arXiv: 1609.09430v2). Other processes can also be used.

In one example, speech detectors can be used to detect the presence or absence of human speech in the electrical input signal using, for example, noise reduction (e.g., via spectral subtraction), feature detection of the electrical input signal, and classification of the features of the electrical input signal to determine if the electrical input signal is characteristic of human speech. One example method for performing speech detection is described in Mesgarani, N., et al., "Discrimination of speech from nonspeech based on multiscale spectrotemporal Modulations," in IEEE Transactions on Audio, Speech, and Language Processing, vol. 14, no. 3, pp. 920-930, May 2006. Other processes can also be used.

In some implementations, the augmented environmental awareness system 102 can use data provided from an augmented reality or virtual reality system to determine if a new sound is present (e.g., data provided by a virtual reality environment that a new sound is present). For example, a virtual reality system can provide data to the augmented environmental awareness system 102 related to what audio/visual is presented to the user 104 in a virtual reality experience.

The electrical input signals 110 that are determined to be characteristic of the new sound are adjusted to generate adjusted electrical signals (204). The electrical signal adjuster 116 can receive the electrical input signals 110 from the new sound detector 114 that are determined to be characteristic of the new sound and perform one or more adjustments to the electrical input signals. Adjustments to the electrical input signal determined to be characteristic of the new sound can include, frequency shift, time-delay, amplitude shift, or a combination thereof. More details of the types of adjustments to the electrical input signal determined to characteristic of the new sound are described with reference to FIGS. 3, 4A and 4B below.

The electrical output signals are generated from the adjusted electrical signals and from the electrical input signals that are not determined to be characteristic of the new sound (206). The electrical output signals can be generated by the electrical output signal generator 120 from stored electrical signals 118 or electrical input signals 110 (e.g., electrical input signals not determined to be characteristic of new sounds). In some implementations, the new sound detector 114 does not detect a new sound in the user's 104 current auditory environment and the electrical output signal generator 120 can generate electrical output signals from the electrical input signals 110.

The electrical output signals are provided to the audio output transducer 122 (208) to convert the electrical output signals into audio signal that can be provided to one or more audio output devices 124 (e.g., headphones or speakers) to produce sound for user 104. For example, the electrical output signals generated from an adjusted electrical signal and electrical input signal not characteristic of the new sound are provided to the audio output transducer 122.

Generating Adjusted Electrical Signals

Figure 3:
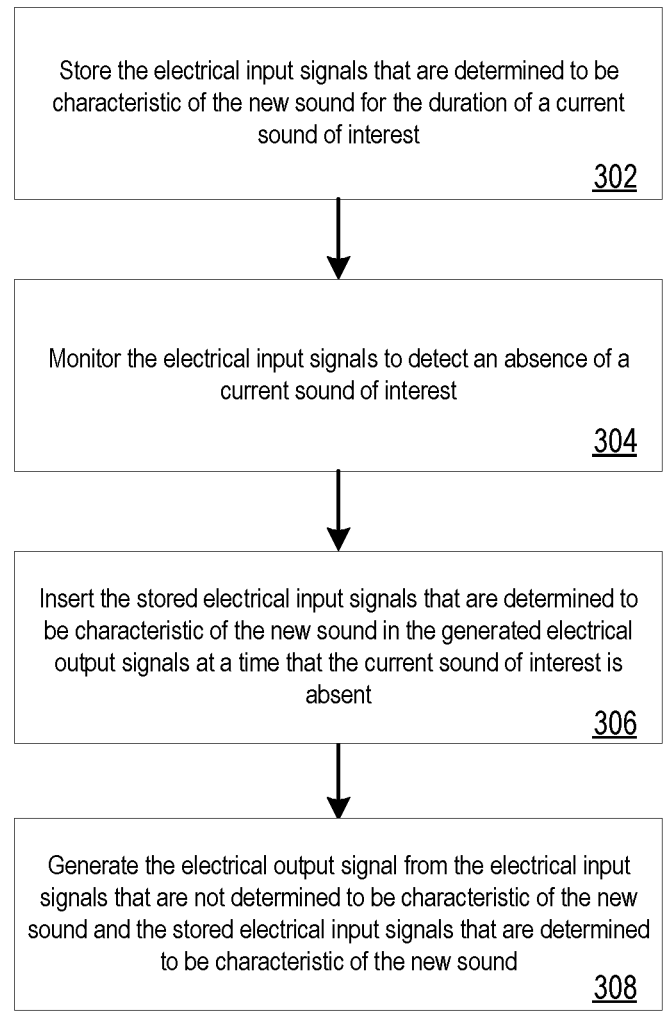
FIG. 3 is a flow diagram of an example process for generating the electrical output signals.

One way of notifying a user of a new sound is to present the new sound after a current sound of interest to a user is no longer present. This can be done by storing the electrical signals indicative of the new sound of interest. In some implementations, the adjusted electrical signals that are determined to be characteristic of the new sound are generated by storing the electrical input signals (e.g., stored electrical signals 118) for a duration of a current sound of interest (e.g., a time-delay of the new sound). FIG. 3 is a flow diagram of an example process 300 for generating the electrical output signals. The electrical input signals that are determined to be characteristic of the new sound are stored for the duration of a current sound of interest (302). The current sound of interest can be a sound to which the user 104 is paying attention (e.g., by monitoring eye gaze, electroencephalogram signals, etc.). For example, a current sound of interest can be a speaking person to whom the user 104 is speaking, which can be determined by the user 104 looking at the speaking person. In another example, the current sound of interest can be determined in a virtual reality or augmented reality system by determining what a user is looking at (e.g., using gaze tracking) or what is being presented to the user in a visual component of the virtual reality or augmented reality experience (e.g., what is being projected on a screen).

The duration of the current sound of interest can be determined for an interval over which the current sound of interest is providing audio input to the augmented environmental awareness system 102. For example, for the duration of active engagement by the speaking person.

In some implementations, the current sound of interest is provided by a virtual/augmented reality system and a duration of the current sound of interest can be provided to the augmented environmental awareness system 102 by the virtual/augmented reality system. For example, if the user 104 is listening to a person speaking in a virtual reality experience in a virtual reality system, the virtual reality system can provide to the augmented environmental awareness system 102 information related to the user's experience and how long the person in the virtual reality experience will be actively speaking.

The electrical input signals are monitored to detect an absence of a current sound of interest (304). An absence of the current sound of interest can be determined by monitoring the electrical input signals characteristic of the current sound of interest. An absence of the current sound of interest can be a pause or an end of a current sound of interest. In one example, a current sound of interest is conversational speech where a pause in the conversation by the speaking person can be detected by monitoring the prosodic signals (e.g., the inflections of speech, emphasis, contrast, focus of speech) of the current sound of interest. A prosodic signal can be a fall in pitch of the speaking person's tone, indicating a conclusion of a statement or expressed thought.

In some implementations, a current sound of interest is provided to the user through a virtual/augmented reality experience through a virtual/augmented reality system where the virtual/augmented reality system can provide information to the augmented environmental awareness system 102 relating to when an absence of the current sound of interest will occur. For example, a user can be playing through a virtual reality game on a virtual reality system such that the virtual reality system has present and future knowledge of occurrences and can provide to the augmented environmental awareness system 102 information relating to when there will be a gap in the current sound of interest in the virtual reality game.

The stored electrical input signals that are determined to be characteristic of the new sound are inserted into the generated electrical output signals at a time that the current sound of interest is determined to be absent (306). For example, the electrical input signals characteristic of a siren in the user's auditory environment can be stored (e.g., in store electrical signals 118) until a person with whom the user 104 is speaking pauses, at which point the electrical signals characteristic of the siren are inserted into the electrical output signals.

The electrical output signals are generated from the electrical input signals that are not determined to be characteristic of the new sound and the stored electrical input signals that are determined to be characteristic of the new sound (308). In some implementations, the new sound is provided to the user 104 after a delayed period of time where the delay is dependent on the augmented environmental awareness system 102 detecting an absence of the current sound of interest. In other words, the electrical output signals from the adjusted electrical signals and the electrical input signals that are not characteristic of the new sound are generated by inserting the stored electrical input signals that are characteristic of the new sound (e.g., in stored electrical signals 118) at a time where an absence of the current sound of interest is detected.

In one example, the augmented environmental awareness system 102 can monitor a current sound of interest (e.g., a person speaking to the user 104) and delay a new sound (e.g., a phone ringing) from being provided to the user 104. The delay of the new sound can be accomplished by storing electrical input signals characteristic of the phone ringing (e.g., in the stored electrical signals 118), until the person speaking to the user pauses or finishes their speech (e.g., pauses for breath, finishes a statement).

FIG. 4A is flow diagram of another example process 400 for generating the electrical output signals. The electrical input signals that are determined to be characteristic of the new sound are adjusted to cause a frequency shift in the new sound when the adjusted electrical signals are used to cause the audio output transducers to generate audio output (402). In some implementations, a frequency shift in the new sound can be shifting the pitch of the new sound, where a high pitch sound corresponds to a high frequency sound wave and a low pitch sound corresponds to a low frequency sound wave.

For example, a frequency shift can be shifting the frequency of the new sound to a lower frequency when the new sound is played through the audio output device such that the lower frequency causes the new sound to be within an audible range of the user 104 and outside the range of the foreground sound.

In another example, a frequency shift can be shifting the pitch of the new sound to a pitch that is distinct from the pitches of the sounds included in the current auditory environment (e.g., raising the pitch of the new sound such that it is distinct from the background sounds).

The adjusted electrical input signals that are determined to be characteristic of the new sound are generated (404) from the frequency shifted electrical input signals that are determined to be characteristic of the new sound. The adjusted electrical input signals can be stored (e.g., in stored electrical signals 118) and provided to the electrical output signal generator 120 to be incorporated into the electrical output signals.

FIG. 4B is a flow diagram of another example process 410 for generating the electrical output signals. The electrical input signals that are determined to be characteristic of the new sound are adjusted to adjust an amplitude in the new sound when the adjusted electrical signals are used to cause the audio output transducers to generate audio output (412). In some implementations, an amplitude adjustment in the new sound can be increasing or decreasing the amplitude of the new sound, where an increased amplitude corresponds to a louder perceived sound by the user 104 and a decreased amplitude corresponds to a quieter perceived sound by the user 104.

For example, an amplitude adjustment can be adjusting the amplitude of the new sound to a higher amplitude when the new sound is played through the audio output device such that the higher amplitude causes the new sound to be perceived by the user 104 as louder relative to auditory environment.

The adjusted electrical input signals that are determined to be characteristic of the new sound are generated (414) from the amplitude adjusted electrical input signals that are determined to be characteristic of the new sound. The adjusted electrical input signals can be stored (e.g., in stored electrical signals 118) and provided to the electrical output signal generator 120 to be incorporated into the electrical output signals.

Figure 5:
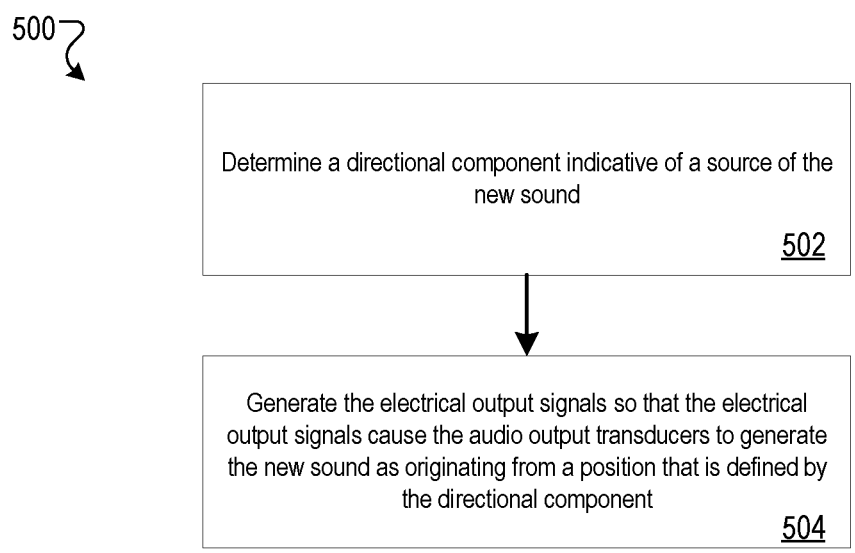
FIG. 5 is a flow diagram of another example process for generating the electrical output signals.

FIG. 5 is a flow diagram of another example process 500 for generating the electrical output signals. In some implementations, a directional component that is indicative of the source (e.g., 108a, 108b) of the new sound that was not present in the current auditory environment before the detection is determined based on the electrical input signals and the data describing the current auditory environment (502). A directional component includes information (e.g., in front of the user 104, behind the user 104, above/below the user 104, etc.) of a location of the source 108a of the new sound relative to the user 104. For example, a new sound may be a person speaking to the user 104 and who is behind the user 104. Information related to the directional component may be stored in stored electrical signals 118 and used by the electrical out signal generator 120 when generating the electrical output signal for the new sound.

The electrical output signals are generated from the adjusted electrical signals and the electrical input signals that are not determined to be characteristic of the new sound. The electrical output signals are generated so that the electrical output signals cause the audio output transducers 122 to generate the new sound as originating from a position that is defined by the directional component (504). The audio signal provided to the user 104 by audio output device 124 can be perceived by the user as originating from a position that is defined by the directional component (e.g., by output panning, by synthesizing a three-dimensional sound location by varying the Interaural Time Difference (ITV) and Interaural Level Difference (ILD) cues, or by full three-dimensional sound rendering using). In one example, surround sound using multiple audio output devices 124 can provide audio signal to the user 104 such that the audio signal is perceived by the user as originating from a position that is defined by the directional component.

In some implementations, an augmented reality or virtual reality experience provide the new sound as originating from a position that is defined by the directional component in accordance to a virtual source being present in the user's virtual/augmented reality experience. For example, a virtual reality experience shows a user a person speaking to the left of the user, and the audio signal of the person speaking is presented to the user such that the user perceives the person speaking to be on their left.

The directional component for a source can change as the user 104 moves relative to the source. In one example, if the source is behind the user, the audio signal can be presented to the user with a directional component indicative of the source being behind the user. If the user 104 then turns to face the source, the directional component indicative of the source will reflect this relative movement and will be indicative of the source being in front of the user.

In some implementations, the augmented environmental awareness system 102 monitors a user's 104 reaction to the presentation of a new sound, and adjusts the presentation of the auditory environment in response. For example, if a user 104 reacts (e.g., turns to face the source of the new sound, stops speaking, pays attention) to the presentation of the new sound, the augmented environmental awareness system 102 can determine that the new sound is a current sound of interest to the user 104. User 104 reactions to the new sound can be determined, for example, using electroencephalogram EEG signals from the user 104 that indicate the user is paying attention, accelerometer data from a user's wearable device (e.g., smart glasses, headphones), a change in the user's speech (e.g., the user stops speaking).

In another example, if the user 104 does not react (e.g., continues speaking, does not indicate paying attention) to the presentation of the new sound, the augmented environmental awareness system 102 can determine that the new sound is not a current sound of interest to the user 104. The augmented environmental awareness system 102 can fade the new sound to a background level (e.g., lower the amplitude of the new sound) or otherwise adjust the new sound to a lower priority in the user's auditory environment.

In some implementations, a user's 104 reaction to the presentation of a new sound can be used by the augmented environmental awareness system 102 to refine one or more machine-learned models used by the new sound detector 114 to detect and identify new sounds that may be of interest to the user 104. For example, if a user 104 ignores the presentation of a new sound (e.g., a window opening), then the augmented environmental awareness system 102 may de-emphasize sounds of the same classification for future new sounds that are detected. In another example, if a user 104 reacts and pays attention to the presentation of a new sound (e.g., a spouse speaking), then the augmented environmental awareness system 102 may emphasize the importance of sounds of the same classification (e.g., that the user's spouse should always be presented as a new sound of interest). A model can be trained using user reactions to the presentation of sounds over a training period to distinguish between a new sound that is of interest to the user 104 and a new sound that is not of interest to the user 104 such that only the electrical input signals that are characteristic of the new sound of interest are adjusted by the electrical signal adjuster 116 to highlight the new sounds of interest when the electrical output signals that are generated with the adjusted electrical signals are provided to the audio output transducer 122.

In some implementations, the system may process speech input from the user to process new sounds according to the user's spoken instructions. For example, a user may not be interested in a new sound and may utter "I don't want to listen to that new sound," and the system may suppress the electrical signals that are characteristic of the new sound. One example use case are sound headphones that make the user aware of physical environment sounds. The user may be listening to a symphony, and when the user's phone rings, the system may present the new sound of the phone ringing to the user. The user may utter "I don't want to listen to that new sound" and the headphones will no longer present the phone ringer to the user, e.g., may isolate the user from physical environment sounds. Conversely, suppose the user is listening to the symphony, and there is noise in the physical environment, e.g., a washing machine is out of balance, or the phone rings, etc. Should the user be interested in the new sound, the user may utter "I want to listen more closely." The system may then continue to present the new sound to the user while suppressing the sounds of current interest, e.g., the electrical signals that are used to generate the symphony are paused or suppressed.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
   audio output transducers that transduce electrical output signals into acoustic sounds; and
   a signal processing device that receives as input electrical input signals, and in data communication with the audio output transducers to provide the electrical output signals to the audio output transducers, and wherein the signal processing device is arranged to execute instructions that cause the signal processing device to perform operations comprising:
   detecting, based on the electrical input signals generated from audio input signals generated by transducers and data describing a current auditory environment, a new sound in the current auditory environment that was not present in the current auditory environment before the detection;
   adjusting electrical input signals that are determined to be characteristic of the new sound to generate adjusted electrical signals, wherein an adjustment to the electrical input signals determined to be characteristic of the new sound comprises:
      determining, based on the electrical input signals and data describing the current auditory environment, a classification of the new sound detected in the current auditory environment;
      assigning, an importance to the new sound relative to the current auditory environment based on the classification of the new sound and the data describing the current auditory environment; and
      adjusting the electrical input signals determined to be characteristic of the new sound relative to electrical input signals that are not determined to be characteristic of the new sound in the current auditory environment based on the assigned importance;
   generating electrical output signals from the adjusted electrical signals that are determined to be characteristic of the new sound and from the electrical input signals that are not determined to be characteristic of the new sound; and
   providing, to the audio output transducers, the electrical output signals.

2. The system of claim 1, wherein the data describing the current auditory environment comprises data generated from electrical input signals received prior to the received electrical input signals from which the new sound was detected.

3. The system of claim 2, further comprising a plurality of audio input transducers that transduce acoustic sounds into electrical input signals, and wherein:
   the signal processing device is in data communication with the audio input transducers; and
   detecting, based on the electrical input signals and data describing the current auditory environment, the new sound that was not present in the current auditory environment before the detection comprises detecting the new sound from the electrical input signals provided from the audio input transducers.

4. The system of claim 1, wherein:
   generating the adjusted electrical signals that are determined to be characteristic of the new sound comprises storing the electrical input signals that are determined to be characteristic of the new sound for a duration of a current sound of interest; and
   generating the electrical output signals from the adjusted electrical signals and electrical input signals that are not determined to be characteristic of the new sound comprises generating the electrical output signal from the electrical input signals that are not determined to be characteristic of the new sound and the stored electrical input signals that are determined to be characteristic of the new sound.

5. The system of claim 3, wherein:
generating the adjusted electrical signals that are determined to be characteristic of the new sound comprises:
monitoring the electrical input signals to detect an absence of a current sound of interest;
and wherein storing the electrical input signals that are determined to be characteristic of the new sound occurs during the monitoring.

6. The system of claim 5, wherein monitoring the electrical input signals to detect the absence of a current sound of interest comprises detecting a prosodic signal that is indicative of an end of the current sound of interest.

7. The system of claim 3, wherein generating the electrical output signals from the adjusted electrical signals and electrical input signals that are not determined to be characteristic of the new sound comprises inserting the stored electrical input signals that are determined to be characteristic of the new sound in the generated electrical output signals at a time that the current sound of interest is absent.

8. The system of claim 3, wherein the new sound is a sound generated by speech.

9. The system of claim 1, wherein:
generating the adjusted electrical input signals that are determined to be characteristic of the new sound comprises adjusting the electrical input signals that are determined to be characteristic of the new sound to cause a frequency shift in the new sound when the adjusted electrical signals are used to cause the audio output transducers to generate audio output.

10. The system of claim 1, wherein detecting, based on the electrical input signals and data describing the current auditory environment, a new sound that was not present in the current auditory environment before the detection includes determining a directional component indicative of a source of the new sound.

11. The system of claim 10, wherein generating electrical output signals from the adjusted electrical signals and electrical input signals that are not determined to be characteristic of the new sound includes generating the electrical output signals so that the electrical output signals cause the audio output transducers to generate the new sound as originating from a position that is defined by the directional component.

12. The system of claim 1, wherein adjusting electrical input signals that are determined to be characteristic of the new sound to generate adjusted electrical signals comprises adjusting an amplitude of the electrical input signals that are determined to be characteristic of the new sound.

13. A method implemented in a data processing apparatus, comprising:
receiving as input, by the data processing apparatus, electrical input signals;
detecting, based on the electrical input signals generated from audio input signals generated by transducers and data describing a current auditory environment, a new sound in the current auditory environment that was not present in the current auditory environment before the detection;
adjusting electrical input signals that are determined to be characteristic of the new sound to generate adjusted electrical signals, wherein an adjustment to the electrical input signals determined to be characteristic of the new sound comprises:
determining, based on the electrical input signals and data describing the current auditory environment, a classification of the new sound detected in the current auditory environment;
assigning, an importance to the new sound relative to the current auditory environment based on the classification of the new sound and the data describing the current auditory environment; and
adjusting the electrical input signals determined to be characteristic of the new sound relative to electrical input signals that are not determined to be characteristic of the new sound in the current auditory environment based on the assigned importance;
generating electrical output signals from the adjusted electrical signals that are determined to be characteristic of the new sound and from the electrical input signals that are not determined to be characteristic of the new sound; and
providing, to the audio output transducers, the electrical output signals.

14. The method of claim 13, wherein the data describing the current auditory environment comprises data generated from electrical input signals received prior to the received electrical input signals from which the new sound was detected.

15. The method of claim 14, further comprising:
transducing acoustic sounds into the electrical input signals; and
detecting the new sound from the electrical input signals provided from the audio input transducers.

16. The method of claim 13, wherein:
generating the adjusted electrical signals that are determined to be characteristic of the new sound comprises storing the electrical input signals that are determined to be characteristic of the new sound for a duration of a current sound of interest; and
generating the electrical output signals from the adjusted electrical signals and electrical input signals that are not determined to be characteristic of the new sound comprises generating the electrical output signal from the electrical input signals that are not determined to be characteristic of the new sound and the stored electrical input signals that are determined to be characteristic of the new sound.

17. The method of claim 16, wherein:
generating the adjusted electrical signals that are determined to be characteristic of the new sound comprises:
monitoring the electrical input signals to detect an absence of a current sound of interest;
and wherein storing the electrical input signals that are determined to be characteristic of the new sound occurs during the monitoring.

18. The method of claim 17, wherein monitoring the electrical input signals to detect the absence of a current sound of interest comprises detecting a prosodic signal that is indicative of an end of the current sound of interest.

19. The method of claim 15, wherein generating the electrical output signals from the adjusted electrical signals and electrical input signals that are not determined to be characteristic of the new sound comprises inserting the stored electrical input signals that are determined to be characteristic of the new sound in the generated electrical output signals at a time that the current sound of interest is absent.

20. The method of claim 13, wherein adjusting electrical input signals that are determined to be characteristic of the new sound to generate adjusted electrical signals comprises adjusting an amplitude of the electrical input signals that are determined to be characteristic of the new sound.

* * * * *